United States Patent
Martin

(10) Patent No.: US 7,360,495 B1
(45) Date of Patent: Apr. 22, 2008

(54) METHOD FOR PLANTER DEPTH MONITORING

(75) Inventor: Howard D. Martin, 206 Elk Fork Rd., Elkton, KY (US) 42220

(73) Assignee: Howard D. Martin, Elkton, KY (US)

( * ) Notice: Subject to any disclaimer, the term of this patent is extended or adjusted under 35 U.S.C. 154(b) by 0 days.

(21) Appl. No.: 11/640,560

(22) Filed: Dec. 18, 2006

(51) Int. Cl.
- *A01C 5/00* (2006.01)
- *A01C 13/00* (2006.01)
- *G06F 7/70* (2006.01)
- *G06F 19/00* (2006.01)
- *G06G 7/00* (2006.01)

(52) U.S. Cl. ............... 111/164; 111/167; 111/195; 111/200; 111/900; 111/926; 701/50

(58) Field of Classification Search ......... 111/52–62, 111/134–137, 149, 157, 163–169, 190–196, 111/200, 900, 926; 701/50
See application file for complete search history.

(56) References Cited

U.S. PATENT DOCUMENTS

| | | | |
|---|---|---|---|
| 2,621,575 A | 12/1952 | Berg | |
| 2,782,703 A | 2/1957 | Chambers et al. | |
| 3,499,495 A | 3/1970 | Pust | |
| 3,561,541 A | 2/1971 | Woelfel | |
| 3,658,133 A | 4/1972 | Sweet et al. | |
| 4,009,799 A | 3/1977 | Fathauer | |
| 4,031,963 A | 6/1977 | Poggemiller et al. | |
| 4,064,945 A | 12/1977 | Haney | |
| 4,163,507 A | 8/1979 | Bell | |
| 4,176,721 A | 12/1979 | Poggemiller et al. | |
| 4,331,205 A | 5/1982 | Sorenson et al. | |
| 4,355,688 A | 10/1982 | Hamm et al. | |
| 4,385,353 A | 5/1983 | Schneider | |
| 4,413,685 A | 11/1983 | Gremelspacher et al. | |
| 4,423,788 A | 1/1984 | Robinson, Jr. et al. | |
| 4,913,070 A | 4/1990 | Morrison, Jr. | |
| 5,235,922 A | 8/1993 | Deckler | |
| 5,406,897 A | 4/1995 | Pingry | |
| 5,427,038 A | 6/1995 | Ege | |
| 5,524,560 A | 6/1996 | Carter | |
| 6,148,747 A | 11/2000 | Deckler et al. | |
| 6,373,057 B1 | 4/2002 | Penfold | |
| 6,389,999 B1 | 5/2002 | Duello | |
| 6,827,029 B1 | 12/2004 | Wendte | |
| 6,906,703 B2 | 6/2005 | Vablais et al. | |
| 6,935,253 B2 | 8/2005 | Murray et al. | |

*Primary Examiner*—Christopher J. Novosad
(74) *Attorney, Agent, or Firm*—Law Office of Jay R. Hamilton, PLC

(57) ABSTRACT

An improved method of monitoring penetration of a planting unit into a ground surface comprising engaging a planting unit with a ground surface wherein the planting unit has a planting unit frame and the planting unit frame is cooperatively engaged with a support member by a planting frame and wherein the planting unit comprises, a seed trench opening assembly operable to create a seed trench in a ground surface, a depth regulating member having a vertical position relative to the seed trench opening assembly and monitoring penetration of the furrow forming structure into the ground surface.

18 Claims, 16 Drawing Sheets

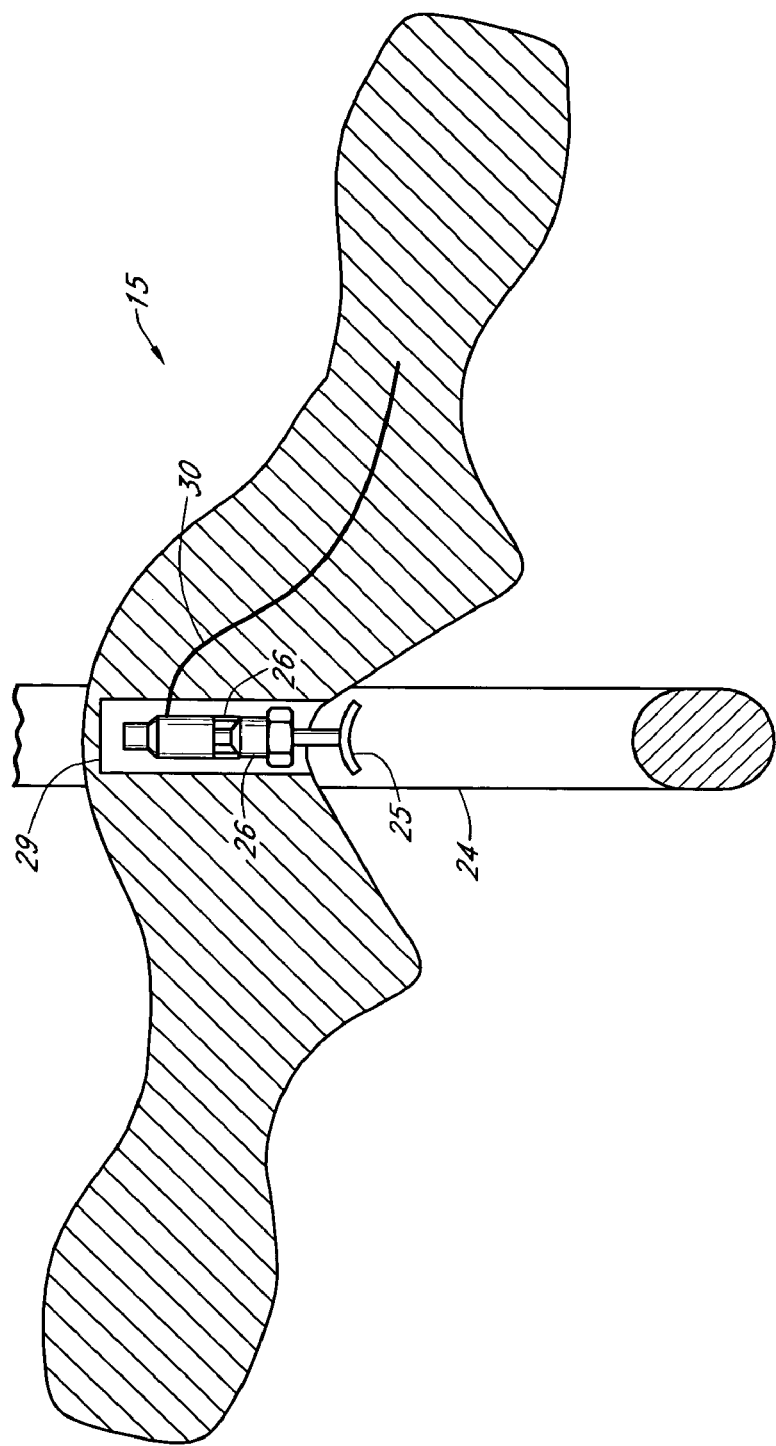

METHOD FOR PLANTER DEPTH MONITORING

FIELD OF THE INVENTION

The methods described herein are generally applicable to the field of agricultural equipment. The embodiments shown and described herein are more particularly for improved delivery of seed to a furrow as used with seed planter row units.

CROSS REFERENCE TO RELATED APPLICATIONS

This non-provisional utility patent application entitled "Method for Planter Depth Monitoring" and is a continuation of the non-provisional utility patent application filed on Jul. 14, 2006, and assigned Ser. No. 11/486,728 by the USPTO, is incorporated by reference herein. A non-provisional utility patent application entitled "Apparatus for Planter Depth Monitoring" and was also filed on Jul. 14, 2006, and assigned Ser. No. 11/486,729 by the USPTO, is also incorporated by reference herein. Applicant claims priority under 35 U.S.C. §120 from both of the preceding cited and co-pending patent applications.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BRIEF DESCRIPTION OF THE DRAWINGS

FIG. 13A provides a cross-sectional view of the depth monitoring means indicating failure to achieve furrow penetration to a desired depth with depth regulating means non-engaged.

DETAILED DESCRIPTION

Listing of Elements

| Element Description | Element Number |
|---|---|
| Lateral Support Member | 1 |
| Planting Unit | 2 |
| Planting Unit Frame | 3 |
| Furrow Opening Assembly | 4 |
| Ground Surface | 5 |
| Seed Delivery Assembly | 6 |
| Furrow Closing Assembly | 7 |
| Gauge Wheel | 8 |
| Pivoting Arm Assembly | 9 |
| Stop | 10 |
| Intentionally Blank | 11 |
| Intentionally Blank | 12 |
| Intentionally Blank | 13 |
| Contact Switch | 14 |
| Saddle Link | 15 |
| Gauge Wheel Arm Pivot | 16 |
| Parallel Linkage | 17 |
| Gauge Wheel Rotation Axis | 18 |
| Intentionally Blank | 19 |
| Intentionally Blank | 20 |
| Rocker | 21 |
| End Bolt | 22 |
| Side Bolt | 23 |
| Yoke Link | 24 |
| Spring Loaded Plunger | 25 |
| Contacts | 26 |
| Intentionally blank | 27 |
| Furrow | 28 |
| Switch Cavity | 29 |
| Wire | 30 |
| Rack | 31 |
| Depth Adjustment Slots | 32 |

DETAILED DESCRIPTION OF INVENTION

Figure 1:
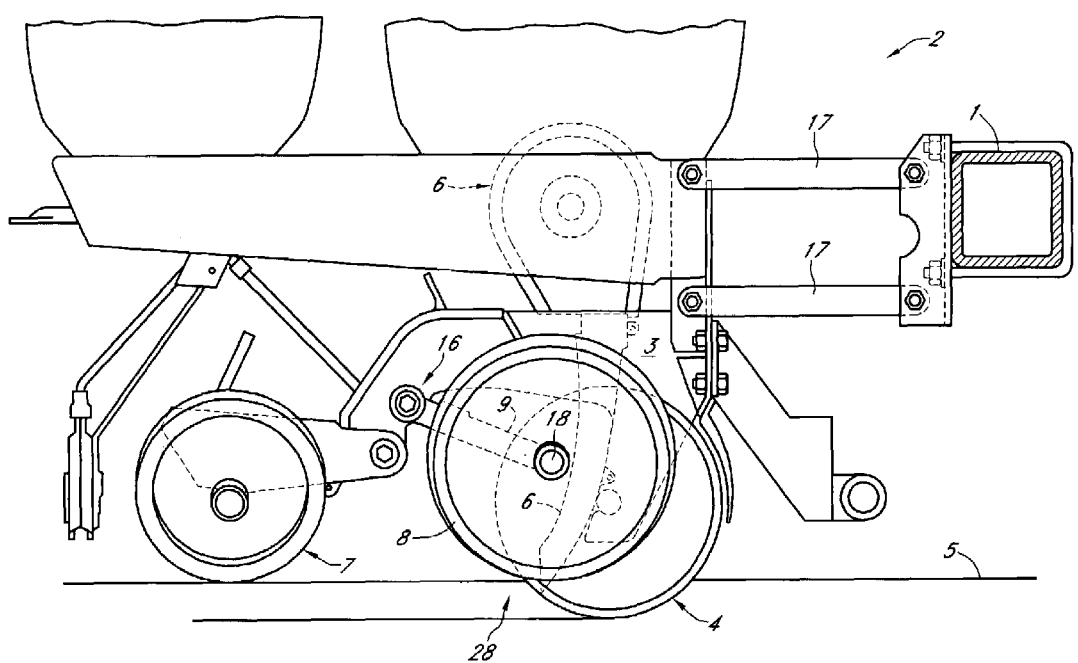
FIG. 1 provides a side view of one embodiment of a row planter unit.

Referring now to the drawings, wherein like reference numerals designate identical or corresponding parts throughout the several views, FIG. 1 shows a lateral support member 1 of a seed planting assembly with a planting unit 2 attached to said lateral support member 1 via parallel linkage 17, which is one means of attaching a planting unit 2 to the lateral support member 1 as recited in the claims. The planting unit 2 includes a furrow opening assembly 4, a planting unit frame 3, a pivoting arm assembly 9 with a gauge wheel 8 rotatably attached at one end, a seed delivery assembly 6 and a furrow closing assembly 7. The seed planting assembly shown in FIGS. 1, 2, 3, 4 and 7 of the type disclosed in U.S. Pat. No. 5,427,038, "Adjustable Gauge Wheel for a Planter" issued to Ege (hereinafter Ege), which is incorporated by reference herein and well known to those skilled in the art. The seed planting assembly shown in FIGS. 8, 9, 10, 11 and 12 is similar to that disclosed in U.S. Pat. No. 6,148,747, "Equalizing Gauge Wheel Mechanism for Row Crop Planter" issued to Deckler et al. (hereinafter referred to as Deckler), which is also incorporated by reference herein and also well known to those skilled in the art. The present art is shown in combination with the prior art in FIGS. 10, 11 and 12. The embodiment disclosed in Deckler also generally includes a furrow opening assembly 4, a planting unit frame 3, a pivoting arm assembly 9 with a gauge wheel 8 rotatably attached at one end, a seed delivery assembly 6 and a furrow closing assembly 7. The present invention may be applied to existing seed planting assemblies with any number of planting units 2 attached to the lateral support member 1. Accordingly, the scope of the present invention is not limited by the number of planting units 2 engaged with the lateral support member 1 of the seed planting assembly. In the embodiments described and disclosed herein, a double disc opener is shown as one type of furrow forming means as recited in the claims, and selection of alternate furrow forming means in no way limits the scope of the current invention.

Figure 2:
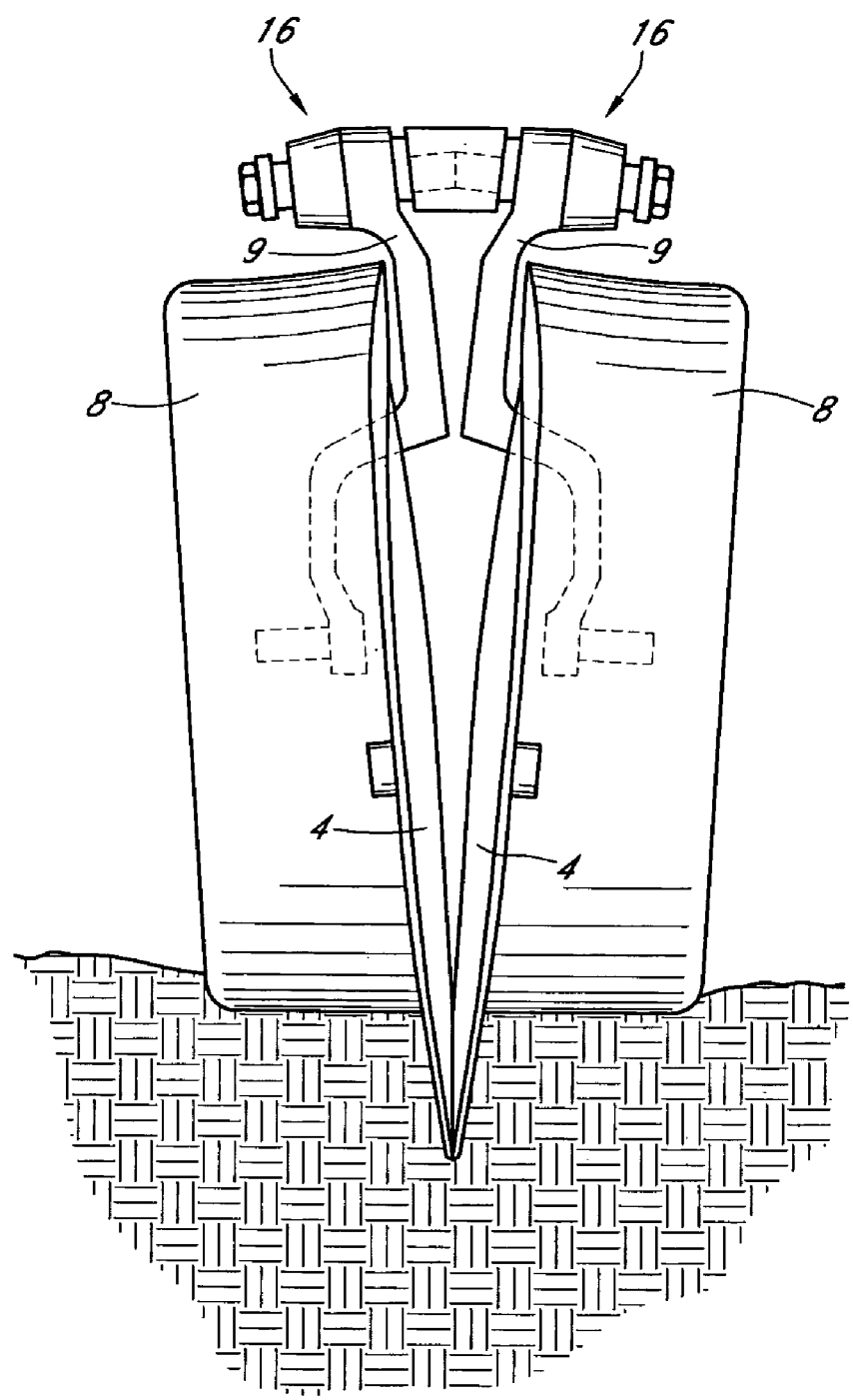
FIG. 2 provides a rear view of one embodiment of a furrow opening device with a depth regulation device.
Figure 3:
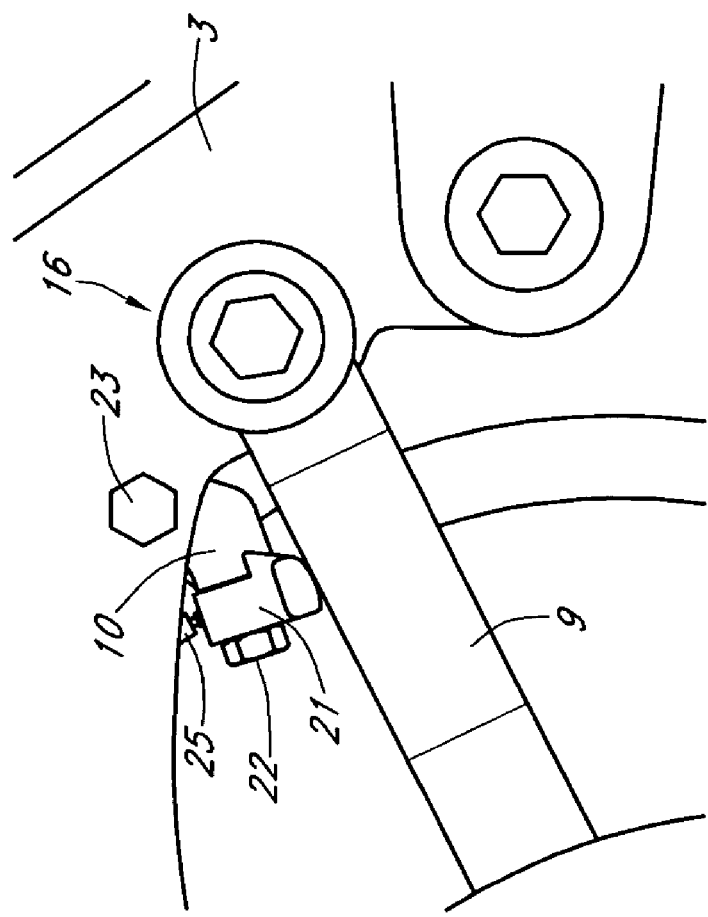
FIG. 3 provides a closer view of one embodiment of the depth monitoring apparatus engaged with one embodiment of a row planter unit.
Figure 4:
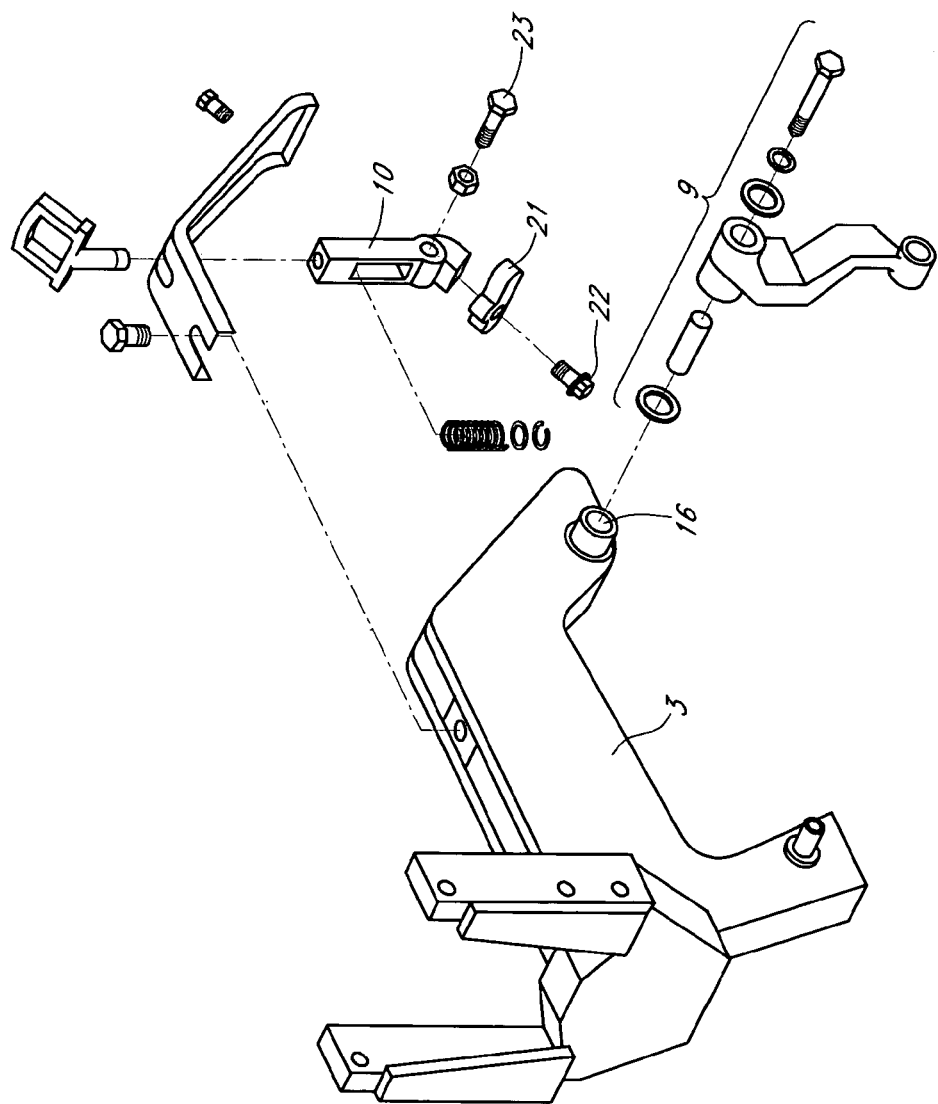
FIG. 4 provides a blow-up of one embodiment of a planter unit shank assembly.
Figure 5:
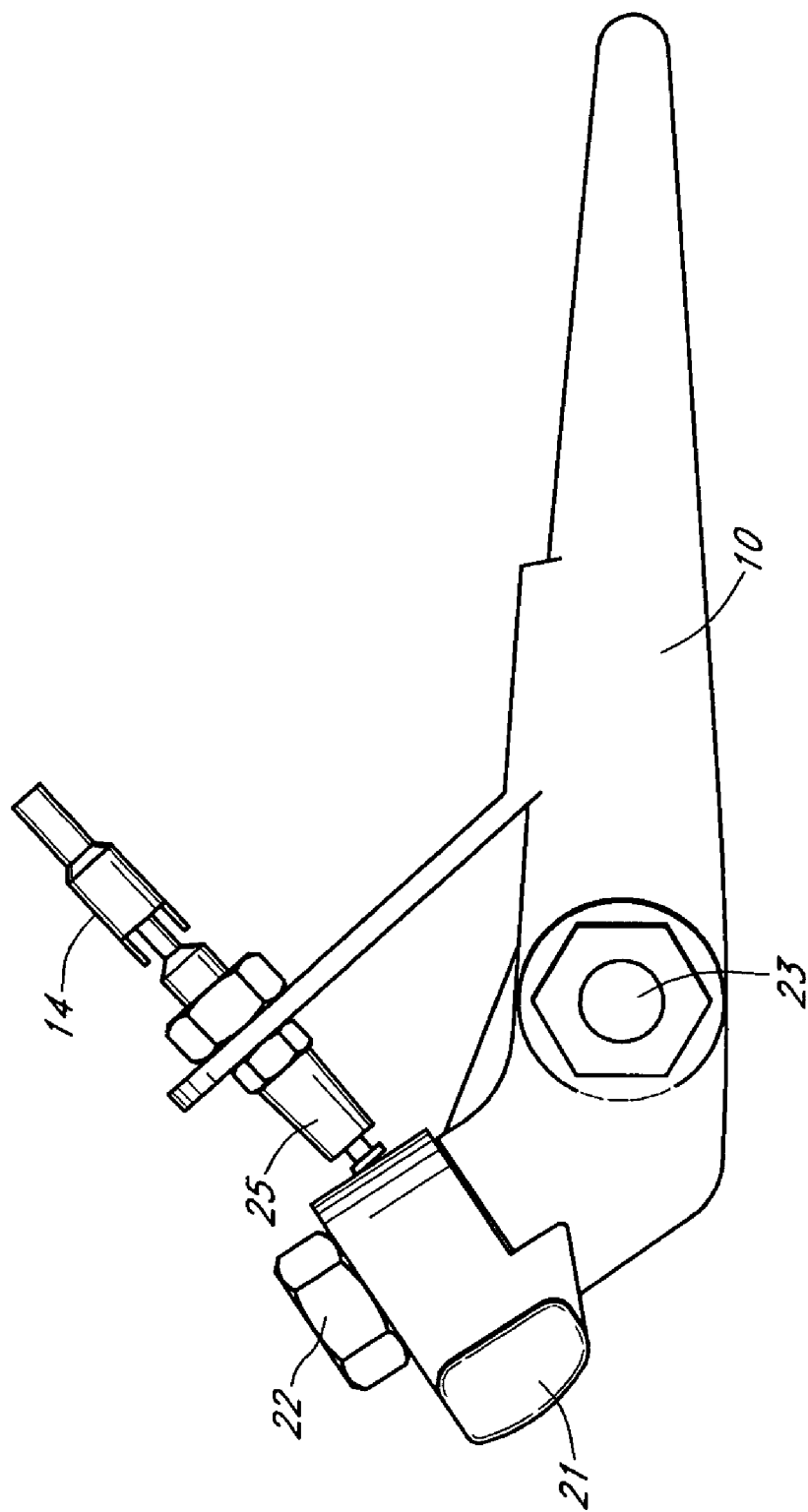
FIG. 5 provides a close view of one embodiment of the depth monitoring apparatus disengaged from a row planter unit.

FIG. 3 shows a close-up view of one embodiment of the depth monitoring apparatus in combination with Ege. In FIG. 3, the depth monitoring apparatus is comprised of a contact switch 14 with a spring loaded plunger 25 mounted to the stop 10. The spring loaded plunger communicates with a rocker 21 in which the hole has been slotted. The rocker 21 is mounted on the stop 10 via the end bolt 22 and provides the limit for upward movement of the pivoting arm assembly 9 with respect to the other elements of the planting unit 2. The stop 24 is mounted to the planting unit frame 3 via the side bolt 23. The rocker 21 in combination with the stop 10 is one type of stop means as recited in the claims. This type of stop means is a type of equalization means, as is well known to those skilled in the art, which allows for a certain amount of vertical travel of one pivoting arm assembly 9 with respect to the other pivoting arm assembly 9 associated with the planting unit 2. As is shown in FIG. 2, the furrow opening assembly 4 in this embodiment is typically positioned between a pair of gauge wheels 8, wherein each gauge wheel 8 communicates with the planting unit 2 via a pivoting arm assembly 9. In FIG. 5 the rocker 21 and stop 10 are shown in combination with a contact switch 14, which together are one type of depth monitoring or indicating means as recited in the claims.

Figure 6A:
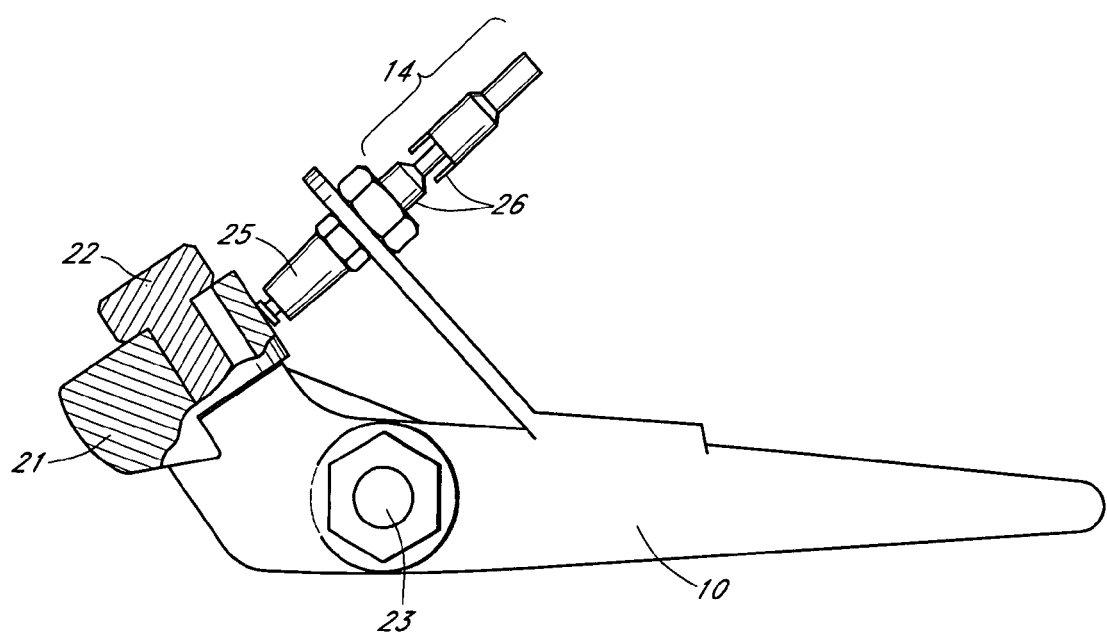
FIG. 6A provides a cross-sectional view of one embodiment of the depth monitoring apparatus with the switch open.
Figure 6B:
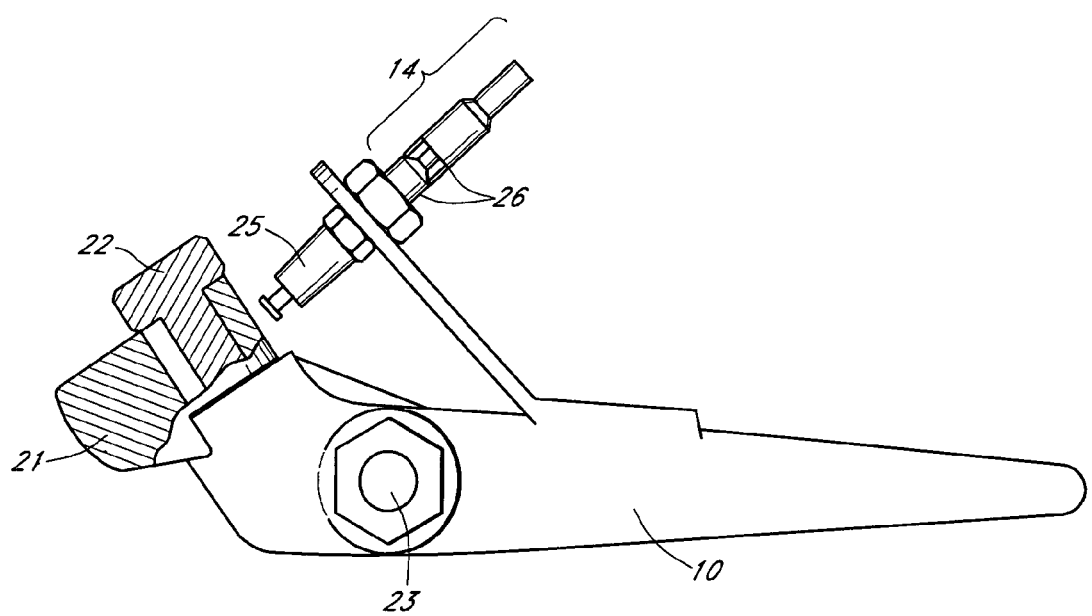
FIG. 6B provides a cross-sectional view of one embodiment of the depth monitoring apparatus with the switch closed.

In the embodiment shown in FIG. 5, the bolt hole in the rocker 21 has been elongated so that the rocker 21 may move in a vertical transverse relation to the axial direction of the end bolt 22. The bolt hole in the rocker 21 is elongated by such an amount (in the embodiment shown in FIGS. 6A, 6B and 7 it is elongated by one eighth of an inch) such that movement of the rocker 21 by the amount of elongation is sufficient to actuate a typical electrical contact switch 14. In FIG. 6A, the rocker 21 is fully engaged with the pivoting arm assembly 9, which subsequently positions the bottom of the elongated hole in the rocker 21 against the bottom of the end bolt 22 and the top outer surface of the rocker 21 against the spring loaded plunger 25, which opens the contact switch 14 and keeps the contacts 26 separated so that the circuit is open. In FIG. 6B, the rocker 21 is not fully engaged with the pivoting arm assembly 9, in which case the spring loaded plunger 25 in combination with gravity subsequently positions the top of the elongated hole in the rocker 21 against the top of the end bolt 22. The top outer surface of the rocker 21 is acted upon by the spring loaded plunger 25, which allows the contacts 26 to close, thus completing a circuit (not shown) of which contact switch 14 may be a part. In this way, the depth monitoring apparatus is able to detect when the desired vertical relation between the furrow opening assembly 4 and the gauge wheel 8 is not maintained, which indicates that the furrow opening assembly 4 is not penetrating the ground surface 5 to the desired depth.

Figure 7:
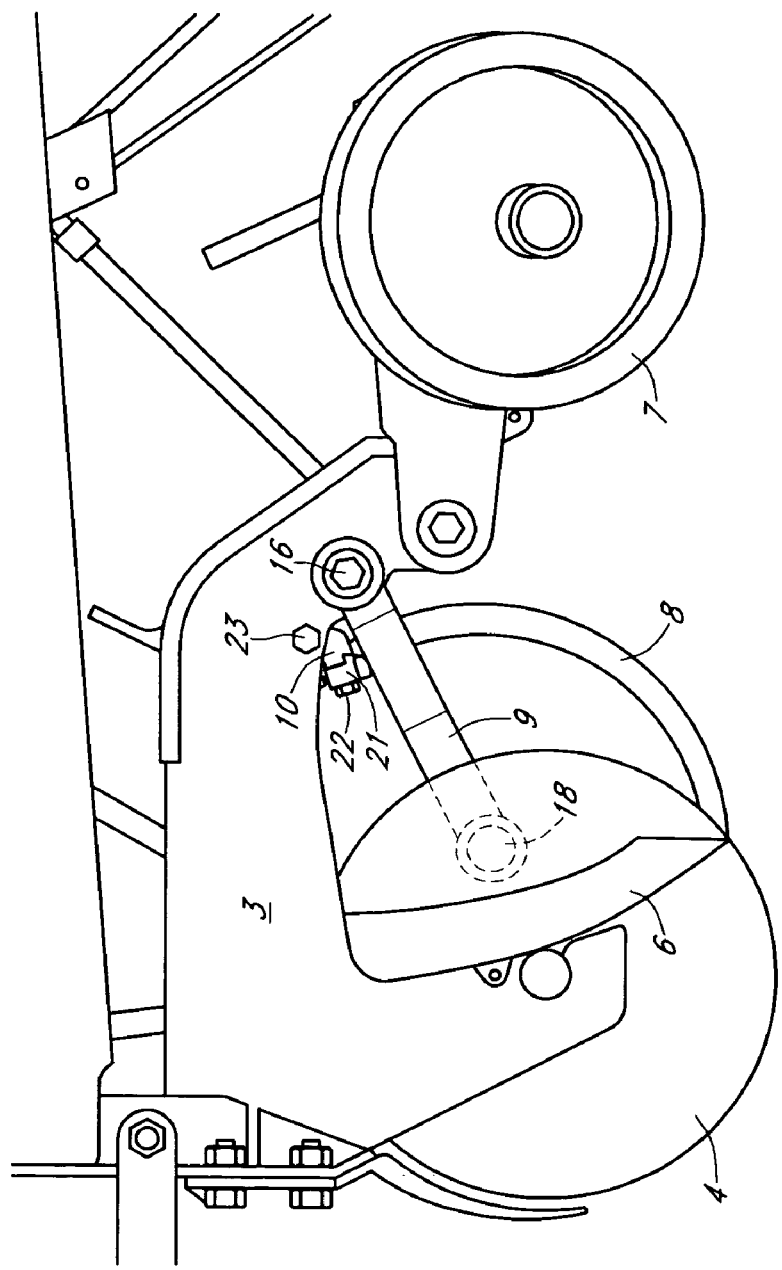
FIG. 7 provides a prospective view of one embodiment of the depth monitoring apparatus engaged with one embodiment of a row planter unit.
Figure 8:
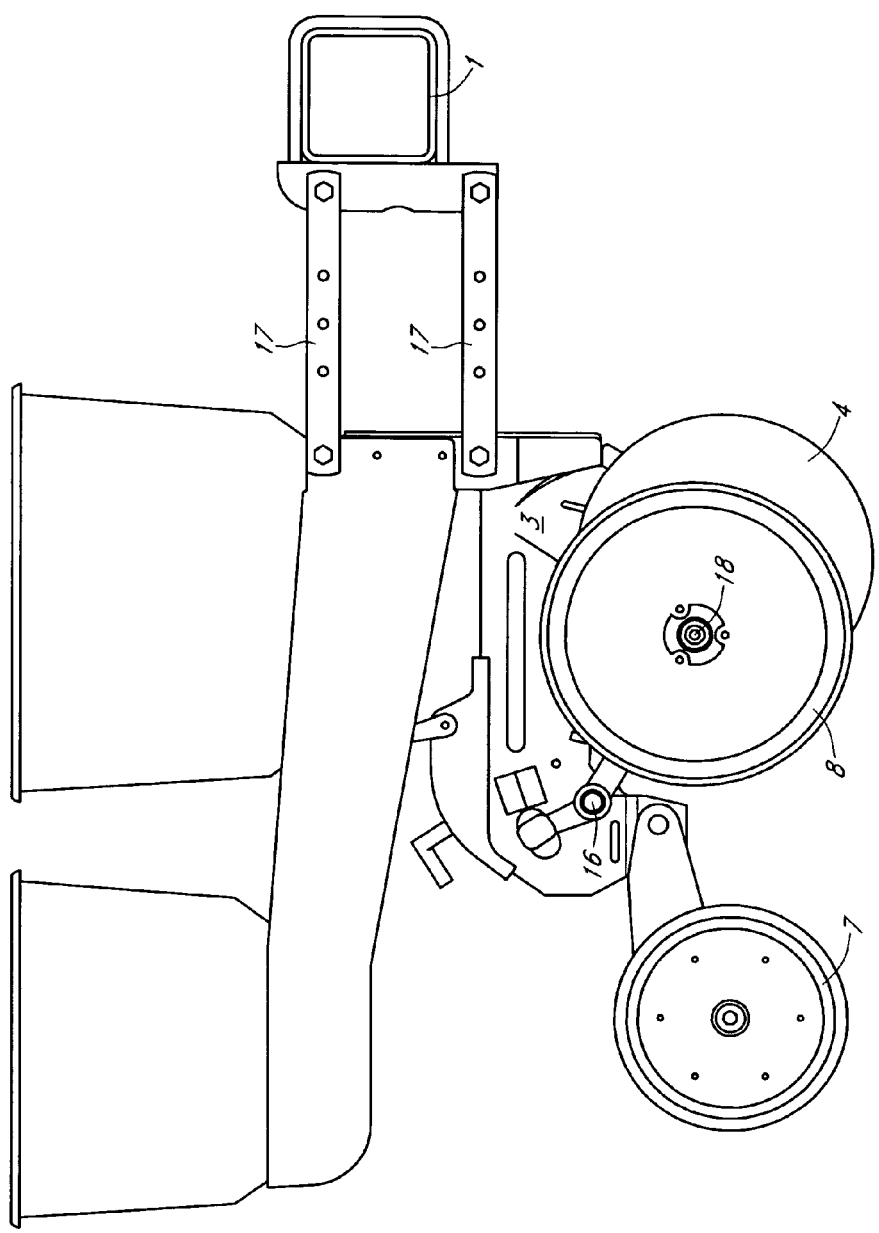
FIG. 8 provides a side view of another embodiment of a row planter unit.
Figure 9:
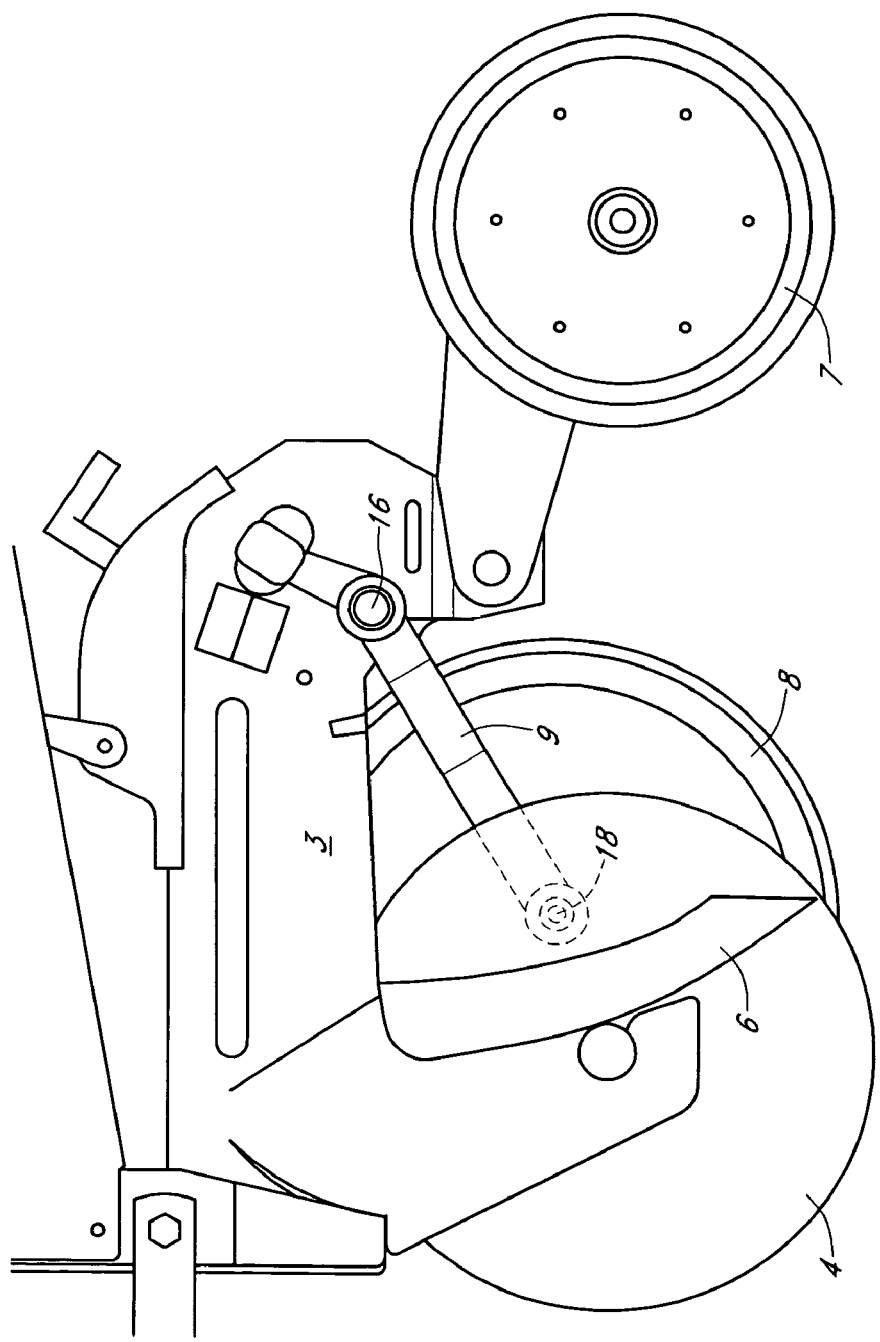
FIG. 9 provides a more detailed side view of another embodiment of a row planter unit.
Figure 10:
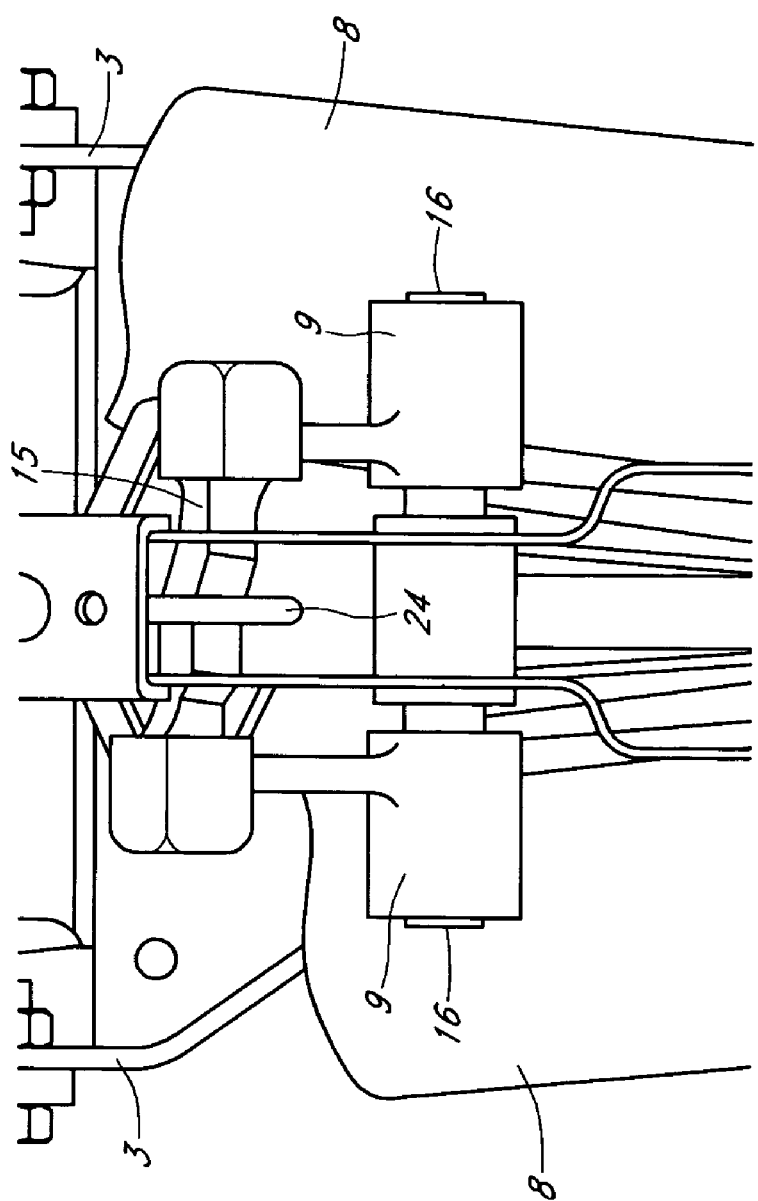
FIG. 10 provides a rear view of another embodiment of a row planter unit.

In the embodiment shown in FIG. 7, a gauge wheel 8 is used as a depth regulation means, but a gauge wheel 8 is merely one type of depth regulation means as recited in the claims. In the embodiment shown in FIG. 7, the gauge wheel 8 is rotatable around the gauge wheel rotation axis 18. The pivoting arm assembly 9 is pivotably engaged with the planter unit frame 3 at the gauge wheel arm pivot 16. The operator is able to adjust the vertical relation between the furrow opening assembly 4 and the gauge wheel 8 by setting the position of the stop 10, thereby controlling the degree of penetration of the furrow opening assembly 4 into the ground surface 5. Adjusting the position of the stop 10 determines the maximum vertical position of the gauge wheels 8 with respect to the furrow opening assembly 4 because the stop 10 and rocker 21 define the limit for vertical movement of the pivoting arm assembly 9 with respect to the furrow opening assembly 4 as well as the other elements of the planting unit 2.

When the gauge wheel 8 is fully engaged with the ground surface 5 (as represented by FIG. 6A), the pivoting arm assembly 9 is engaged with the rocker 21. When the gauge wheel 8 is not fully engaged with the ground surface 5 (as represented by FIG. 6B), the gauge wheel is allowed to drop in vertical relation with respect to the furrow opening assembly 4 and the other elements of the planting unit 2, and the rocker 21 is no longer engaged with the spring loaded plunger 25. Subsequently, the vertical relation between the furrow opening assembly 4 and the gauge wheels 8 is less than that which was set by the operator and the contacts 26 in the contact switch 14 are allowed to communicate. In this embodiment, the depth monitoring apparatus detects whether the pivoting arm assembly 9 is fully engaged with the rocker 21, thereby detecting whether the furrow opening assembly 4 is penetrating the ground surface 5 to the furrow 28 depth set by the operator. The resulting information can be relayed to the seed planting assembly operator, as is well known to those skilled in the art, by transmission means, such as electrical conduit, wireless transmitters using radio frequencies, which may be blue tooth enabled, microwave frequencies or other means as recited in the claims, to a display accessible to the seed planting assembly operator. Visual sensory means, such as lights, are another type of sensory means which may be used to alert the operator that the furrow opening assembly 4 is not penetrating the ground surface 5 as recited in the claims.

Figure 11:
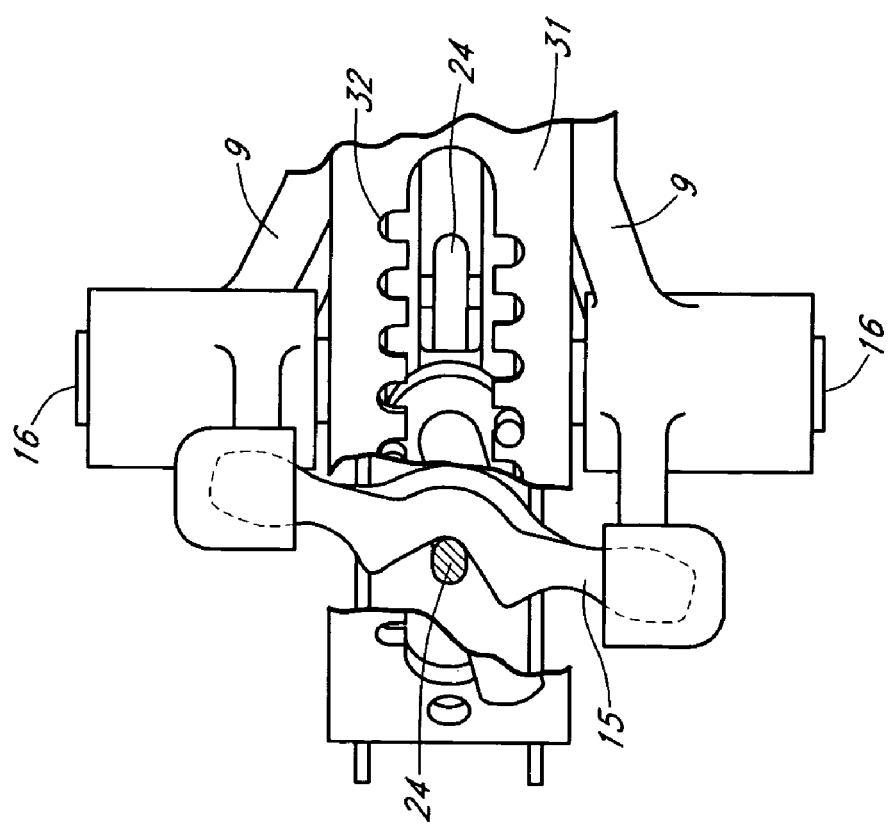
FIG. 11 provides a top view of another embodiment of a row planter unit.

The operation of the embodiment shown in FIGS. 8-13 is similar to the depth monitoring apparatus in the embodiments previously shown in FIGS. 1-7. In the embodiment shown in FIGS. 8-13, the pivoting arm assembly 9 is also pivotably engaged with the planting unit frame 3, and the depth to which the furrow opening assembly 4 is allowed to penetrate the ground surface 5 is again adjustable by the operator and dictated by the relative vertical position between the furrow opening means 4 and the gauge wheels 8. The relative vertical position of the gauge wheels 8 with respect to the furrow opening assembly 4 when the gauge wheels 8 are fully engaged with the ground surface 5 is indicated by the engagement of the saddle link 15 with the yoke link 24. The saddle link 15 is one type of equalizing arm to allow for a certain degree of independent vertical motion between two gauge wheels 8, which may be used alone or in pairs, as is well known to those skilled in the art and as further illustrated by the rear view shown in FIG. 10. The combination of the saddle link 15 and the yoke link 24 is one type of stop means as recited in the claims. FIG. 11 provides a top view of the saddle link 15 engaged with the yoke link 24 in relation to rack 31 and depth adjustment slots 32 which are partially shown without a depth monitoring indicating means installed therein to illustrate the existing relationship between the elements of the prior art. One embodiment of the present art as disclosed and claimed herein is illustrated in FIG. 12, FIG. 12A, FIG. 13 and FIG. 13A. As illustrated in the preceding figures, the present art may be cooperatively engaged with depth adjustment and regulating means of the prior art.

Figure 12:
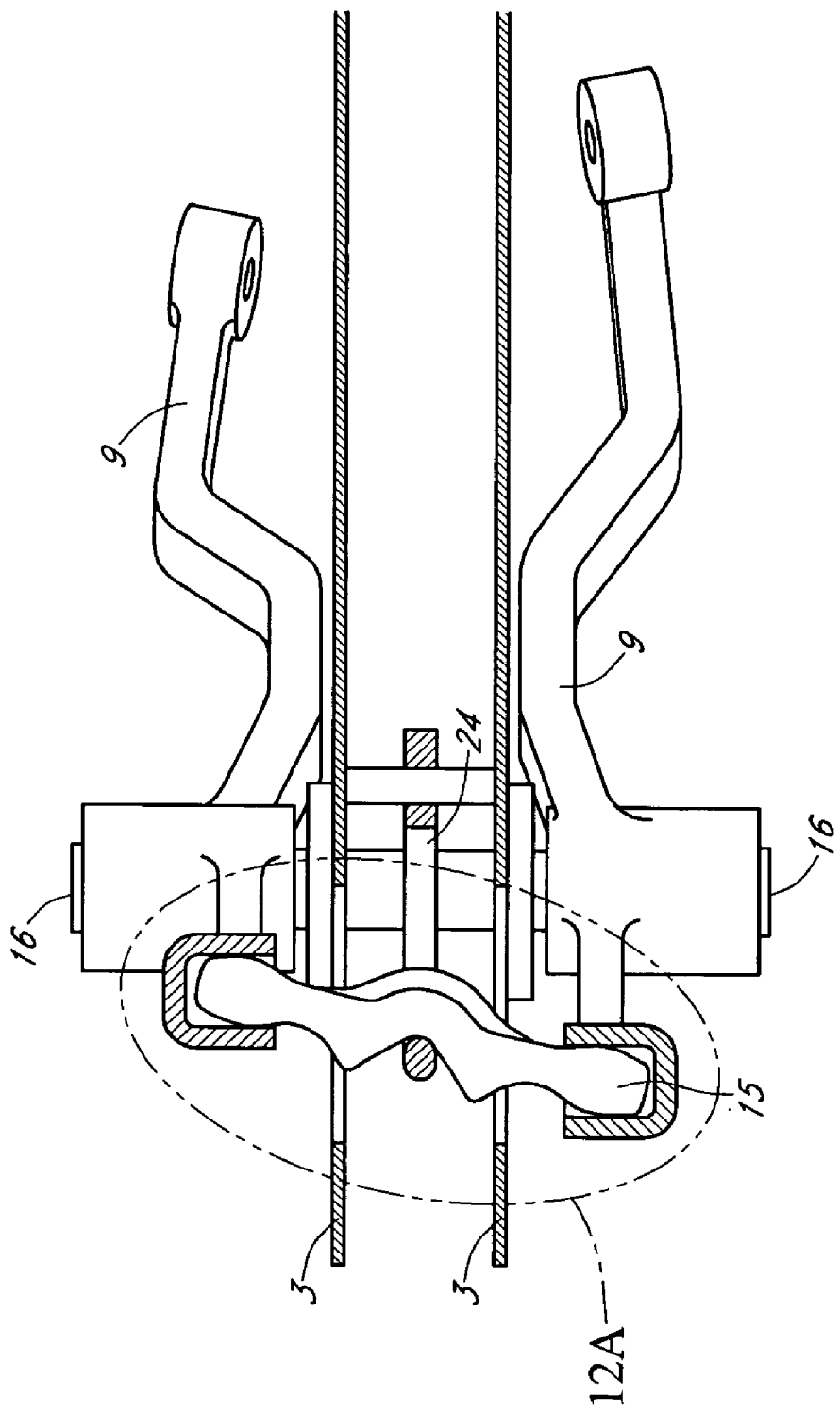
FIG. 12 provides a top view of one embodiment of the depth regulating means engaged.
Figure 12A:
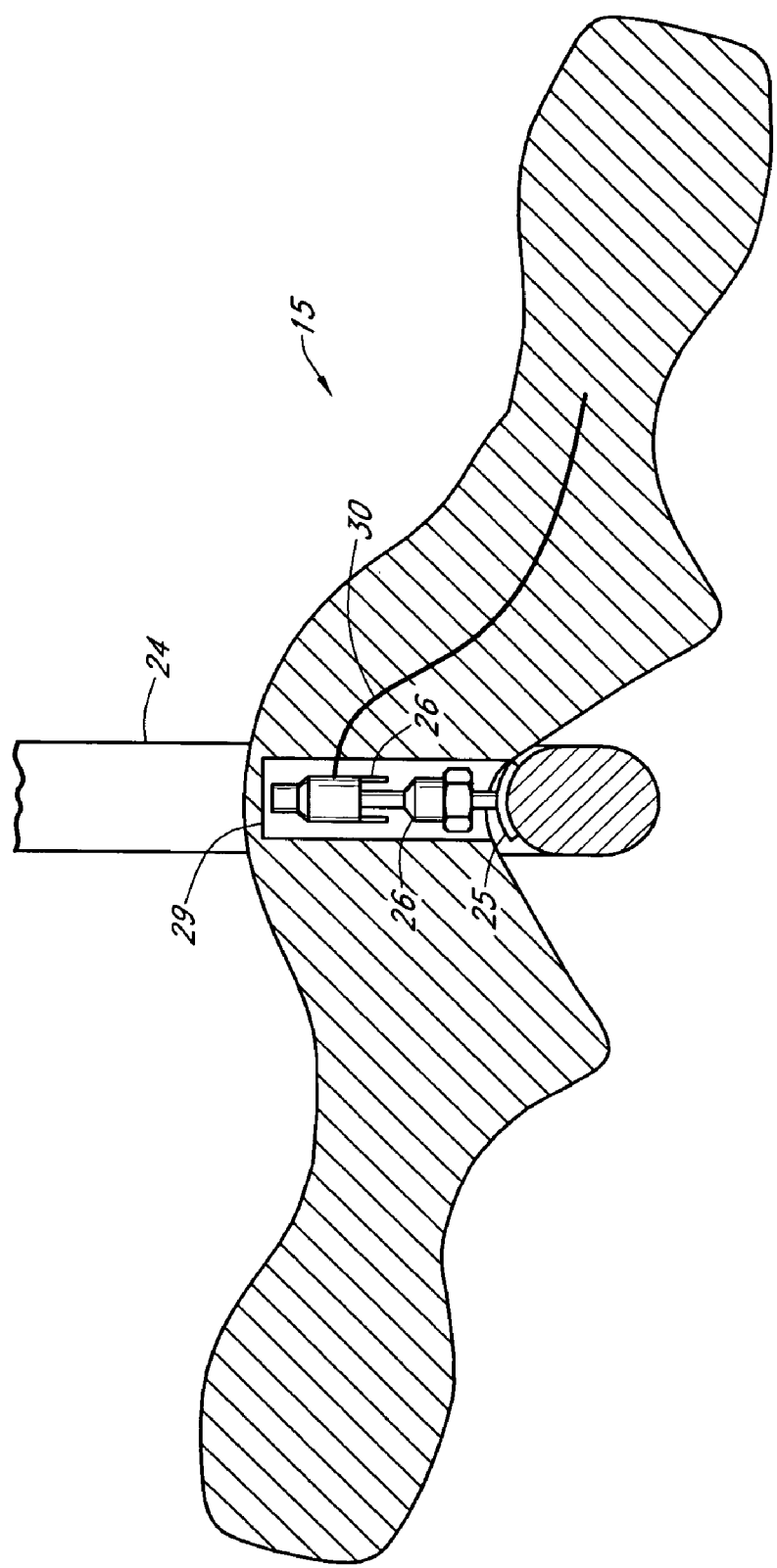
FIG. 12A provides a cross-sectional view of the depth monitoring means indicating furrow penetration to a desired depth with depth regulating means engaged.

FIG. 12 illustrates the condition wherein the pivoting arm assembly 9 of the depth regulating means are "up" indicating the furrowing opening assembly 4 is penetrating the ground surface 5 to the set depth. The depth monitoring means as employed is a switch 14 integrated into switch cavity 29 formed in the saddle link 15. As illustrated in FIG. 12A, the switch 14 is depressed when the saddle link 15 is engaged with yoke link 24. As illustrated in FIG. 12 and FIG. 12A, the spring loaded plunger 25, shaped as a clamshell in this embodiment for engagement with the yoke link 24, is actuated and contacts 26 of switch 14 are open. In this condition, the open switch 14 does not complete the circuit (not shown) and does not allow transmission of a signal through wire 30.

Figure 13:
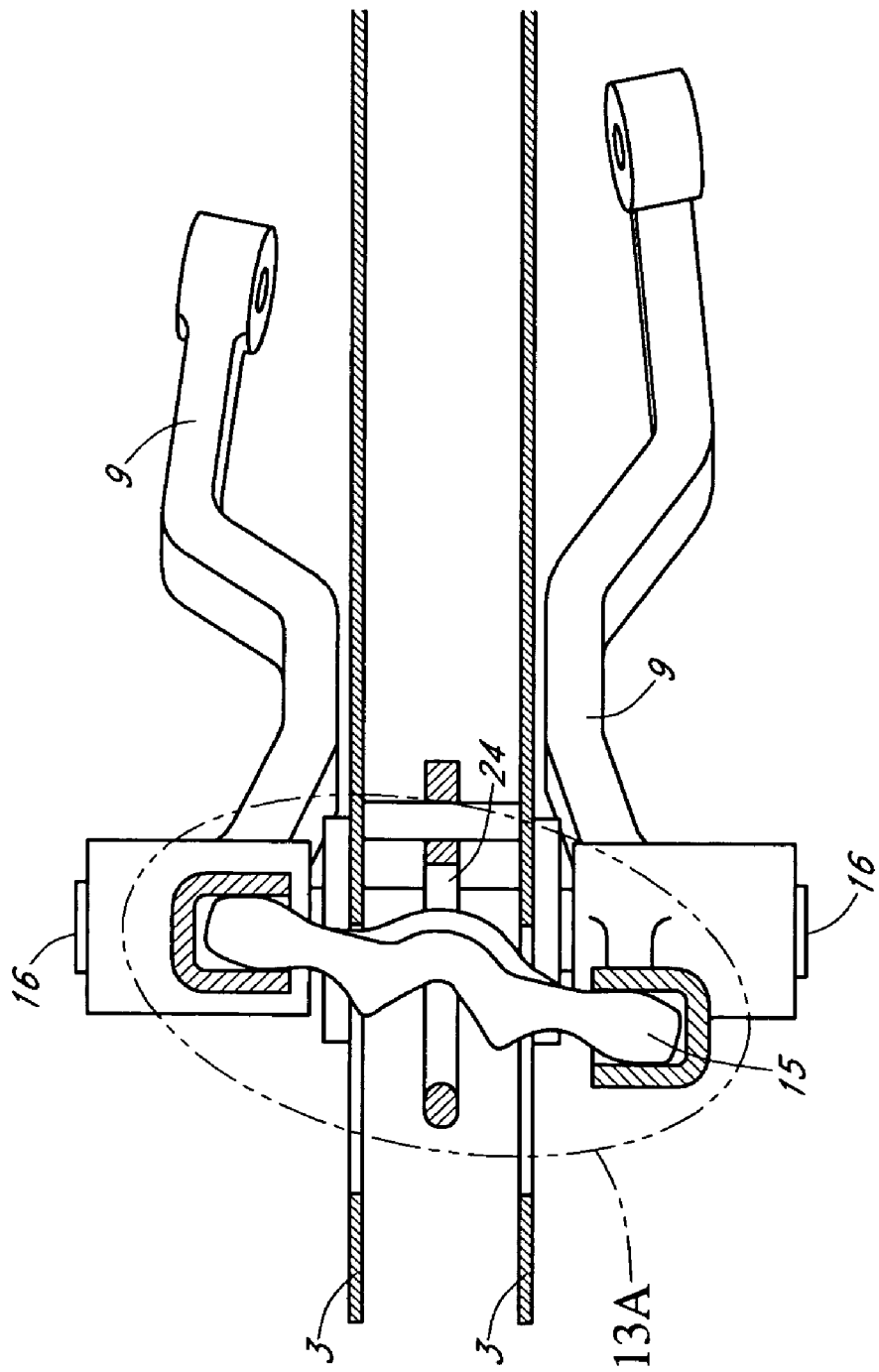
FIG. 13 provides a top view of the embodiment as shown at FIG. 12 with the depth regulating means non-engaged.

FIG. 13 illustrates the condition wherein the depth regulating means, having pivoting arm assembly 9, is "down" indicating the furrowing opening assembly 4 is not penetrating the ground surface 5 to the desired or set furrow 28 depth. The depth monitoring means as employed is again a switch 14 integrated into switch cavity 29 which is formed in saddle link 15. As illustrated in FIG. 13A, the switch 14 is not depressed when the saddle link 15 is not engaged with yoke link 24. As illustrated in FIG. 13 and FIG. 13A, the spring loaded plunger 25 is not actuated and contacts 26 of switch 14 are closed. In this condition, the closed switch 14 will complete the circuit (not shown) and allow transmission of a signal through wire 30.

Although not shown, it will be apparent to those skilled in the arts that a limit switch may also be used in combination with the stop and depth regulating means for depth monitoring or indication. In this embodiment, the target portion of the limit switch would be mounted to the stop means and a switch activator mounted to the depth regulating means, wherein said depth monitor or indicator means would be actuated by physical contact between the target and switch activator portions of the limit switch. In another embodiment, not shown, the target portion of the limit switch would be mounted to the depth regulating means and a switch activator mounted to the stop means, wherein said depth monitor or indicator means would be actuated by physical contact between the target and switch activator portions of the limit switch.

The scope of the current invention is not limited by the choice of switch, switch types or number of switches employed to detect differences in the vertical relation between the furrow opening means 4 and the gauge wheels 8 in any of the embodiments. Any other detection means or technology, such as a mechanical device, an electro-mechanical device, electro-photo device or any combinations thereof, may be used as a depth monitoring or indicating means as recited in the claims.

As with the previously described embodiment, when the gauge wheels 8 are not fully engaged with the ground surface 5, the furrow opening assembly 4 is not penetrating the ground surface 5 to the desired depth and the gauge wheels 8 are allowed to assume a lower vertical relation with respect to the other elements of the planting unit 2, which subsequently changes the relative vertical position of the gauge wheels 8 and the furrow opening assembly 8.

In planting units 2 such as those described herein, the weight of the elements attached to the planting unit frame 3 generally provide a first source of down pressure to the furrow opening assembly 4. As such, down pressure is necessary for the penetration of the ground surface 5 by the furrow opening assembly 4 and the proper amount of down pressure is critical to achieving optimal emergence and yields. Many times additional means of providing the furrow opening assembly 4 with down pressure are employed and typically called supplemental down pressure systems and may include pneumatic systems, spring tension systems or pressurized fluid systems. The disclosed invention is applicable to all types of planters regardless of whether the planter is outfitted with a supplemental down pressure means and if so, which type it employs. Accordingly, the scope of the present invention is not limited by the presence or absence of supplemental down pressure means on a given planting unit 2 or the type of supplemental down pressure means.

By providing the operator with a display to alert the operator to whether the furrow opening assembly 4 is penetrating the ground surface 5 to the desired depth, the depth monitoring apparatus provides an efficient means for determining if more or less down pressure is needed under a given set of planting conditions. As disclosed in the prior art, those skilled in the arts have provided adequate means for control and or adjustment of the down pressure applied. Furthermore, the display means may be incorporated with a computer programmed to compile a percentage of acres for which the furrow opening assembly 4 penetrated the ground surface 5 at the selected depth for each planting unit 2, thereby providing the operator with a data set to use when adjusting the down pressure to the optimal amount. The display means could also be integrated with existing planter monitors that display other information critical to optimal operation, such as seed delivery, seed delivery rate, acres planted, global positioning systems data and or seed population per acre.

It should be noted that the present invention is not limited to the specific embodiments pictured and described herein, but is intended to apply to all similar methods for monitoring, indicating or validating depth control and or furrow penetration of a planting, seeding or drill unit during operation. Accordingly, modifications and alterations from the described embodiments will occur to those skilled in the art without departure from the spirit and scope of the present invention.

The invention claimed is:

1. An improved method of monitoring penetration of a planting unit into a ground surface comprising:
   a. engaging a planting unit with a ground surface wherein said planting unit has a planting unit frame and said planting unit frame is cooperatively engaged with a support member wherein the planting unit comprises:
      i. a seed trench opening assembly operable to create a seed trench in a ground surface;
      ii. a seed delivery assembly delivering seeds into the seed trench;

iii. a seed trench closing assembly operable to close the seed trench;
iv. a depth regulating member having a vertical position relative to said seed trench opening assembly, wherein said depth regulating member experiences an actual vertical force that controls ground surface engagement;
v. a pivoting arm assembly connecting said depth regulating member to said planting unit frame; and
vi. a stop means mechanically engaging a portion of said pivoting arm assembly for defining a limit for vertical motion of said depth regulating member in the direction substantially opposite said ground surface;
b. applying down pressure to said planting unit to ensure penetration of said planting unit into said ground surface;
c. allowing the planting unit to respond to terrain and elevation changes in said ground surface while maintaining a desired depth of seed placement during travel across said ground surface;
d. controlling the down pressure applied to the planting unit; and,
e. monitoring penetration of said furrow forming means into said ground surface wherein the depth monitoring means indicates engagement of said arm assembly with said stop means.

2. The improved method of monitoring penetration of said planting unit into said ground surface as set forth in claim 1 further comprising transmitting engagement information of said arm assembly with said stop means through a transmission means to a display means.

3. The improved method of monitoring penetration of said planting unit into said ground surface as set forth in claim 2 wherein said transmission means is in communication with a data collection means.

4. The improved method of monitoring penetration of said planting unit into said ground surface as set forth in claim 3 wherein said data collection means is a computer.

5. The improved method of monitoring penetration of said planting unit into said ground surface as set forth in claim 4 wherein said computer has an operator interface for communication with a planting unit assembly operator.

6. The improved method of monitoring penetration of said planting unit into said ground surface as set forth in claim 5 wherein said computer is integrated into a planter monitor.

7. The improved method of monitoring penetration of said planting unit into said ground surface as set forth in claim 1 wherein said depth monitoring means indicates penetration of said furrow forming means into said ground surface through indication and comparison of the selected vertical difference between said depth regulation means and said furrow forming means with the measured vertical difference between said depth regulation means and said furrow forming means.

8. The improved method of monitoring penetration of said planting unit into said ground surface as set forth in claim 1 wherein said depth monitoring means has an indication means selected from the group consisting of mechanical devices, electro-mechanical devices, electro-photo devices and combinations thereof.

9. The improved method of monitoring penetration of said planting unit into said ground surface as set forth in claim 1 further comprising adjusting the down pressure applied to the planting unit through a supplemental down pressure means for controlling the down pressure to said planting unit.

10. An improved method of monitoring penetration of a planting unit into a ground surface comprising:
a. engaging a planting unit with a ground surface wherein said planting unit has a planting unit frame and said planting unit frame is cooperatively engaged with a support member wherein the planting unit comprises:
i. a seed trench opening assembly operable to create a seed trench in a ground surface;
ii. a seed delivery assembly delivering seeds into the seed trench;
iii. a seed trench closing assembly operable to close the seed trench;
iv. a depth regulating member having a vertical position relative to said seed trench opening assembly, wherein said depth regulating member experiences an actual vertical force that controls ground surface engagement;
v. a pivoting arm assembly connecting said depth regulating member to said planting unit frame; and
vi. a stop means mechanically engaging a portion of said pivoting arm assembly for defining a limit for vertical motion of said depth regulating member in the direction substantially opposite said ground surface;
b. applying down pressure to said planting unit to ensure penetration of said planting unit into said ground surface;
c. allowing the planting unit to respond to terrain and elevation changes in said ground surface while maintaining a desired depth of seed placement during travel across said ground surface;
d. controlling the down pressure applied to the planting unit;
e. monitoring penetration of said furrow forming means into said ground surface; and
f. indicating engagement of said arm assembly with said stop means for detecting presence or absence of furrow forming means penetration into said ground surface.

11. The improved method of monitoring penetration of said planting unit into said ground surface as set forth in claim 10 further comprising transmitting engagement information of said arm assembly with said stop means through a transmission means to a display means.

12. The improved method of monitoring penetration of said planting unit into said ground surface as set forth in claim 11 wherein said transmission means is in communication with a data collection means.

13. The improved method of monitoring penetration of said planting unit into said ground surface as set forth in claim 12 wherein said data collection means is a computer.

14. The improved method of monitoring penetration of said planting unit into said ground surface as set forth in claim 13 wherein said computer has an operator interface for communication with a planting unit assembly operator.

15. The improved method of monitoring penetration of said planting unit into said ground surface as set forth in claim 14 wherein said computer is integrated into a planter monitor.

16. The improved method of monitoring penetration of said planting unit into said ground surface as set forth in claim 10 wherein penetration of said ground surface by said furrow forming means is through indication and comparison of the selected vertical difference between said depth regulation means and said furrow forming means with the measured vertical difference between said depth regulation means and said furrow forming means.

17. The improved method of monitoring penetration of said planting unit into said ground surface as set forth in claim 10 wherein the means of indication of engagement of said arm assembly with said stop means for detecting presence or absence of furrow forming means penetration into said ground surface is selected from the group consisting of mechanical devices, electro-mechanical devices, electro-photo devices and combinations thereof.

18. The improved method of monitoring penetration of said planting unit into said ground surface as set forth in claim 10 further comprising adjusting the down pressure applied to the planting unit through a supplemental down pressure means for controlling the down pressure to said planting unit.

* * * * *